Sept. 23, 1958     A. L. SPANGENBERG     2,853,346
BEARINGS
Filed May 10, 1955
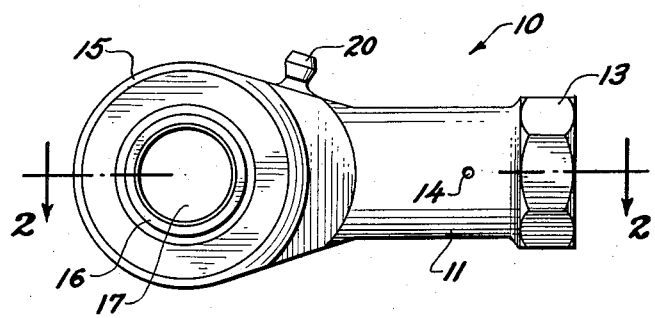
*Fig. ~1~*
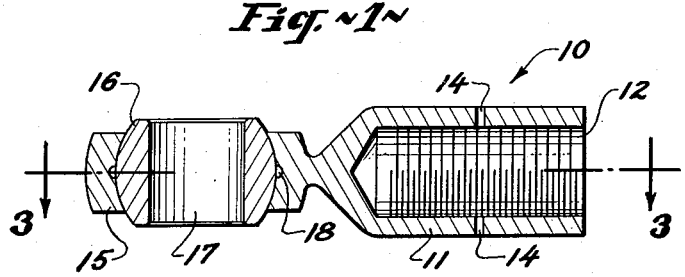
*Fig. ~2~*
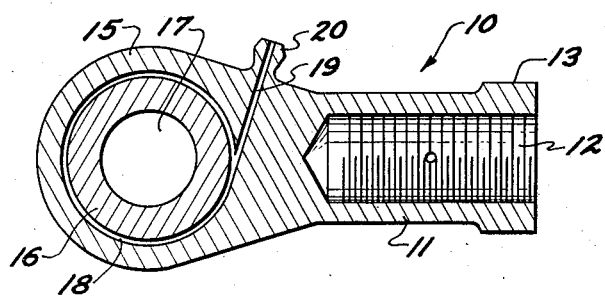
*Fig. ~3~*
INVENTOR.
ALFRED L. SPANGENBERG
BY
Pollard Johnston Smythe & Robertson
ATTORNEYS.

United States Patent Office 2,853,346
Patented Sept. 23, 1958

2,853,346

BEARINGS

Alfred L. Spangenberg, Weston, Conn., assignor, by mesne assignments, to Stephens-Adamson Mfg. Co., a corporation of Illinois Application May 10, 1955, Serial No. 507,250

3 Claims. (Cl. 308—121)

The present invention relates generally to bearings, and is particularly directed to improvements in self-aligning bearings.

Self-aligning bearings have many applications and are particularly widely used in aircraft control systems where relative deflection or distortion of the parts of the airframe supporting the various interconnected elements of a control system may be substantial, for example, in the engine controls and in the controls for the shutters of the engine nacelle regulating the admission of cooling air to the latter.

Since self-aligning bearings generally include a spherical or ball-shaped body received in an outer race member having a spherical inner surface engaging the surface of the ball-shaped body to retain the latter within the outer race member while permitting relative universal movement of the body and race member so that a rod, shaft, pin or other mechanical element can be pivotally, revolubly or slidably supported in or on the spherical body without the danger of binding therein.

In order to ensure that the spherical body remains free to undergo universal movement relative to the race member, it has been found to be desirable to provide for the lubrication of the contacting spherical surfaces of the body and race member. For this purpose, the spherical inner surface of the race member may be provided with a centrally located, annular groove opening against the spherical surface of the body and communicating with a passage which extends through the race member to a fitting on the outside of the latter having a configuration suitable for engagement by a standard lubricating "gun." Thus, a supply of lubricant can be periodically injected at the external fitting and conveyed by the passage to the annular groove for distribution by the latter between the contacting surfaces of the body and race member as such elements of the self-aligning bearing are universally moved relative to each other.

If, as in the past, the external lubricating fitting on the outer race member is formed separate from the latter and merely driven or threaded into an enlarged counterbore at the outer end of the passage in the race member, it is possible for the lubricating fitting to be dislodged or loosened, particularly when the bearing is subjected to continuous vibration, as in the engine compartment of an airplane, and to fall from the race member thereby creating the danger of becoming jammed between other working parts and interfering with the operation of the latter. Further, the use of a lubricating fitting produced separate from the race member of the bearing complicates both the production and assembly of the bearing and results in a relatively high cost for the latter.

Accordingly, it is an object of the present invention to provide a bearing, particularly a self-aligning bearing of the described character, wherein the outer race has an integral projection thereon formed for engagement by a standard lubricating gun and replacing the separate lubricating fitting mentioned above thereby substantially simplifying the construction of the bearing and correspondingly decreasing the cost of the latter, as well as positively avoiding the inadvertent separation of the lubricating fitting from the remainder of the bearing.

The foregoing, and other objects, features and advantages of the invention will be apparent in the following detailed description of an illustrative embodiment thereof which is to be read in connection with the accompanying drawing forming a part hereof, and wherein:

Fig. 1 is a side elevational view of a self-aligning bearing embodying the present invention and incorporated in a rod-end fitting;

Fig. 2 is a sectional view taken along the line 2—2 of Fig. 1; and

Fig. 3 is a sectional view taken along the line 3—3 of Fig. 2.

Referring to the drawing in detail, a rod-end fitting, which includes a self-aligning bearing embodying this invention, is there illustrated and generally identified by the reference numeral 10. The rod-end fitting 10 includes an elongated body 11 having an axially extending, blind bore 12 opening at one end thereof (Figs. 2 and 3) which is internally threaded to receive a correspondingly threaded end of a rod or connecting link (not shown). Preferably, the body 11 is formed with wrench flats 13 on the exterior thereof adjacent the end at which the bore 12 opens for engagement by a suitable tool in effecting the turning of the rod-end fitting relative to the rod for adjusting the effective length of an assembly made up of a rod and fittings of the illustrated type at the opposite ends thereof. Further, the body 11 may have diametrically opposed radial openings 14 communicating with the bore 12 and adapted to receive a pin passing through the related rod-end to secure the fitting with respect to the rod following the adjustment of the length of the assembly.

The body 11, at the end thereof remote from the open end of bore 12, is integral with an annular part forming the outer race member 15 of a self-aligning bearing embodying the present invention. The outer race member 15 has a spherical inner surface and embraces a spherical or ball-shaped body 16 which has a bore 17 extending therethrough to pivotally, revolubly or slidably support a rod, pin, shaft or other mechanical element. The contacting spherical surfaces of the race member 15 and body 16 serve to retain the latter within the race member while permitting the universal movement of the ball-shaped body relative to the annular race member.

In order to provide for lubrication of the contacting spherical surfaces of the race member 15 and body 16, the spherical inner surface of the race member is formed with a centrally located annular groove 18 (Figs. 2 and 3) opening radially inward against the spherical surface of body 16, and the race member 15 further has a passage 19 (Fig. 3) communicating tangentially with the groove 18 and extending to the exterior of the race member.

In accordance with the invention, a projection 20 (Figs. 1 and 3) is formed integral with the race member 15 at a location on the race member corresponding to the outer end of the passage 19, and the latter continues through the projection 20. The exterior surface of the projection 20 has a configuration adapting it for engagement by a standard lubricating "gun," so that a supply of suitable lubricant can be periodically injected in to the passage 19 and conveyed by the latter to the groove 18 which distributes the lubricant between the contacting surfaces of the race member and spherical body.

Since the projection 20 is integral with the race member 15, there is no possibility that it may become dislodged or separated from the race member, as in the case of the usual separately formed lubricating fitting, even when the bearing is subjected to continuous vibration. Further, the provision of the projection 20 integral with the race member 15 substantially simplifies the construction and assembly of the bearing, which thereby consists merely of two parts, namely the race member 15 with the projection 20 thereon and the spherical body 16, and results in corresponding reductions in the cost of the bearing when compared with the cost of a bearing having a separate lubrication fitting requiring an additional assembly step to secure the fitting to the outer race member.

Although the bearing embodying this invention has been described and illustrated as part of the rod-end fitting 10, it is to be understood that this represents only one possible application of the bearing, and that the safety, simplification and economy resulting from the provision of a projection integral with the outer race member to replace the usual separate lubricating fitting may be similarly obtained in self-aligning bearings employed in different ways, for example, where the outer race member is secured to a bracket or other support and the spherical body slidably or revolubly carries a shaft or rod, or where the outer race member, rather than being part of a rod-end fitting, is formed as part of a bell-crank or lever member.

It is also to be noted that changes and modifications, other than, and in addition to, those specified above may be effected in the specific illustrative embodiment of the invention described in detail herein and shown in the accompanying drawing without departing from the scope and spirit of the invention, as defined in the appended claims.

What is claimed is:

1. A two-piece self-aligning bearing consisting of a formed annular race member having a spherical inner surface, and a spherical body engaged by said inner surface of the race member so that the body is retained in the latter while being free to engage in universal movement relative to said race member, said race member having an integral projection extending therefrom and formed with an external surface adapted to be engaged by a lubricating gun, said race member further having internal passageways extending from said projection and opening at said inner surface of the race member against said spherical body for supplying lubricant to the contacting surfaces of said race member and body.

2. A two-piece rod-end fitting embodying a self-aligning bearing and consisting of a tubular member open at one end to receive the end portion of a rod and integral, at its other end, with a formed annular member having a spherical inner surface to define an outer race member, and a spherical body engaged by said spherical inner surface of the annular member so that the body is retained in the latter while being free to engage in universal movement relative to said race member, said annular member having an integral projection extending from the outer periphery thereof and formed with an external surface adapted to be engaged by a lubricating gun, said annular member further having passageways extending from said inner surface thereof through said projection for receiving lubricant at the latter for distribution between the contacting surfaces of said race member and spherical body.

3. A two-piece rod-end fitting embodying a self-aligning bearing and consisting of a tubular member open at one end to receive the end portion of a rod and integral, at its other end, with a formed annular member having a spherical inner surface to define an outer race member, and a spherical body engaged by said spherical inner surface of the annular member so that the body is retained in the latter while being free to engage in universal movement relative to said race member, said annular member having an integral projection extending from the outer periphery thereof and formed with an external surface adapted to be engaged by a lubricating gun, said annular member further having an annular groove in said spherical inner surface thereof opening radially inward against said spherical body and a passage extending substantially tangentially from said groove through said projection to receive lubricant at the latter for distribution between the contacting surfaces of said race member and spherical body.

References Cited in the file of this patent

UNITED STATES PATENTS

| | | |
|---|---|---|
| 470,202 | La Croix | Mar. 8, 1892 |
| 1,175,288 | Patrick | Mar. 14, 1916 |
| 2,382,773 | Chambers et al. | Aug. 14, 1945 |
| 2,464,492 | Dimick | Mar. 15, 1949 |
| 2,498,011 | Sherbondy | Feb. 21, 1950 |
| 2,626,841 | Potter | Jan. 27, 1953 |

FOREIGN PATENTS

| | | |
|---|---|---|
| 527,197 | Great Britain | Oct. 3, 1940 |